United States Patent Office 2,963,479
Patented Dec. 6, 1960

2,963,479

2-ARYL-4,7-DIAMINO-6-CYANOPTERIDINES

Edward C. Taylor, 1530 Spring Garden St.,
Princeton 1, N.J.

No Drawing. Filed Aug. 6, 1959, Ser. No. 831,950

11 Claims. (Cl. 260—251.5)

This invention relates to novel 2-aryl-4,7-diamino-6-cyanopteridine derivatives and a method for their preparation.

The compounds which are the object of this invention have diuretic and natriuretic activity with a minimum of side effects. Furthermore, these compounds are very useful as intermediates for preparing various 6-substituted - 2 - aryl - 4,6 - diaminopteridines which have pronounced diuretic activity.

More specifically, the substituted cyanopteridines of this invention are represented by the following structural formula:

FORMULA I

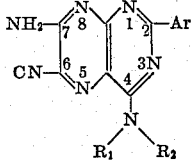

when:

Ar represents thienyl or

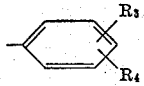

$R_1$ and $R_2$ represent hydrogen or lower alkyl; and
$R_3$ and $R_4$ represent hydrogen, halogen having an atomic weight of less than 80, lower alkyl, lower alkoxy, nitro, amino or hydroxy.

Advantageous compounds of this invention are represented by the following structural formula:

FORMULA II

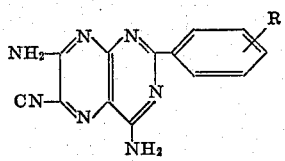

when R represents hydrogen, halogen having an atomic weight of less than 80, methyl, methoxy, nitro, amino or hydroxy.

The advantageous and preferred compound of this invention is 2-phenyl-4,7-diamino-6-cyanopteridine.

The terms "lower alkyl" and "lower alkoxy," where used herein, define aliphatic groups having a maximum of 4 carbon atoms and, preferably, not more than 2 carbon atoms.

The compounds of this invention are prepared by a method which is another aspect of this invention, namely the reaction of a 2-phenyl-4,6-diamino-5-nitrosopyrimidine with malononitrile according to the following procedure:

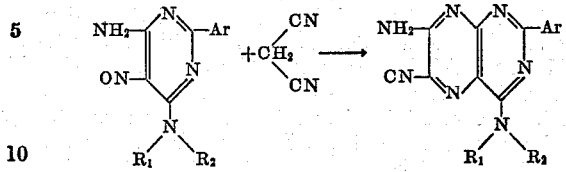

The terms in the illustrated procedure are as previously defined.

A 2-phenyl-4,6-diamino - 5 - nitrosopyrimidine is condensed with malononitrile by heating in an organic solvent in which the reactants are substantially soluble and with which neither the reactants nor products are chemically reactive. Preferably the organic solvent is a liquid tertiary amine, having a boiling point sufficiently elevated to carry out the condensation in appreciable yields, such as above 50° C. The organic amine, additionally as noted above, must also be one in which the reactants are substantially soluble and with which the reactants are not reactive. Exemplary of such amines are pyridine, 5-ethyl-2-methylpyridine, lutidine, picoline, lipidine, quinoline, triethylamine, tributylamine, dimethylaniline and the like. Especially preferred is pyridine.

The reaction temperature can vary widely, however, will usually range from about 50 to 150° C., advantageously from about 85-100° C. The reaction time can also vary but no particular advantage is realized in carrying out the reaction longer than from about 1 to 12 hours, usually 3-6 hours. Approximately equimolar amounts of the reactants or, preferably, some excess of the malononitrile are commonly used. The above reaction conditions are satisfactory with little advantage found beyond the limits described.

The 4-unsubstituted amino-6-amino - 2 - aryl - 5 - nitrosopyrimidine intermediates are prepared by the reaction of an amidine hydrohalide such as hydrochloride or hydrobromide, with, preferably, a slight excess of the silver salt of isonitrosomalononitrile in a lower alcohol solvent, such as methanol or ethanol, and the thermal cyclization of the resulting amidine salt in an organic solvent such as, for example, 5-ethyl-2-methylpyridine, 2- or 3-picoline, pyridine or quinoline or in mixtures of these solvents. The cyclization is conveniently carried out by heating at reflux temperature for about 5 to 60 minutes. A ratio of one gram of amidine salt to about five grams of solvent is advantageous.

The 4-alkylamino-6-amino-2-aryl-5 - nitrosopyrimidine intermediates are prepared by condensing an amidine hydrohalide, such as, preferably, the hydrochloride or hydrobromide, with, preferably, a slight excess of ethyl cyanoacetate in a lower alcohol solvent such as ethanol or methanol in the presence of an alkali metal alkoxide, for example sodium methoxide, sodium ethoxide or potassium ethoxide. The reactants are heated conveniently at the reflux temperature of the solvent for approximately three to six hours. Working up the reaction mixture by evaporating the solvent, adding water to the residue, cooling and isolating the precipitate by filtration gives the 6-amino-2-aryl-4-pyrimidol. Treatment of this pyrimidol with a chlorinating agent such as phosphorus pentachloride, thionyl chloride or, preferably, phosphorus oxychloride advantageously in the presence of an acid-binding agent such as dimethylaniline or pyridine gives 6-amino- 2-aryl-4-chloropyrimidine. Reaction of this chloropyrimidine with at least an equivalent amount of alkylamine in aqueous solution yields 4-alkylamino-6-amino-2-aryl-pyrimidine. Treatment of this 4-alkylamino-6-amino-2-arylpyrimidine in acid solution with at least an equivalent amount of sodium nitrite at about +5° to −5° C. gives the 4-alkylamino-6-amino-2-aryl-5-nitrosopyrimidine intermediate.

The amidine hydrohalide starting materials, having substituents in the meta or para positions, are conveniently prepared by passing dry hydrogen chloride into a lower alcohol solution, preferably methanol or ethanol of the appropriate benzonitrile. The resulting solution is allowed to stand at room temperature while it sets to a solid cake which is then treated with an excess of dry ammonia in absolute alcohol, such as methanol or ethanol. The reaction mixture is shaken for about 10 to 20 hours then allowed to stand for about 48 hours. The mixture is worked up by filtering, evaporating to dryness, dissolving the residue in water and acidifying with concentrated hydrohalic acid, for example hydrochloric or hydrobromic acid, concentrating and filtering the amidine hydrohalide.

The o-substituted amidine hydrohalide starting materials are conveniently prepared by treatment of the o-substituted benzonitrile with, preferably, a slight excess of hydroxylamine hydrochloride in lower alcohol solution, such as ethanol or methanol, in the presence of an alkali metal alkoxide such as sodium or potassium alkoxide, for example, sodium ethoxide or potassium methoxide. The reactants are heated conveniently at the reflux temperature of the solvent for about six to ten hours and the mixture worked up to give the o-substituted benzamidoxime which is hydrogenated in lower alcohol solution, such as methanol or ethanol, using a hydrogenation catalyst such as Raney nickel at about 60° to 70° C. until the theoretical amount of hydrogen is taken up. The alcohol solution is filtered, evaporated to dryness and the residue dissolved in hot alcohol such as methanol or ethanol. Cooling the solution and treating with hydrogen halide causes precipitation of the o-substituted amidine hydrohalide.

The compounds of this invention, furthermore, have utility as intermediates in the preparation of diuretic compounds formed by chemical reaction of the 6-cyano moiety, such as by reacting the cyano compound with hydrogen peroxide in base, for instance 10% sodium hydroxide, to give the strongly diuretic amide of Formula III:

FORMULA III

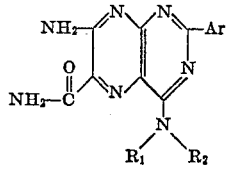

in which $R_1$, $R_2$ and Ar are as described above.

Also, the 6-cyano compounds are useful in forming diuretically-active amidrazones of the following structure:

FORMULA IV

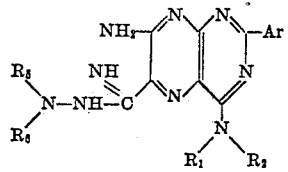

in which $R_{1-4}$ and Ar are as defined above and $R_5$ and $R_6$ are hydrogen or lower alkyl. These compounds are prepared by suspending the 6-cyano compounds of this invention in a lower alcohol, such as methanol or ethanol, adding the desired hydrazine and heating at reflux. The resulting red solution is diluted with water to form the biologically-active amidrazone of Formula IV. These compounds are alternatively called substituted 6-pteridine imidic acid hydrazides. Similarly, other amines, for instance benzylamine, are reacted with the cyano intermediates to prepare diuretic N-substituted carboxamidines or hydroxylamine to give the amidoxime. These compounds will be the subject of other patent applications.

The following examples are not limiting but are illustrative of compounds of this invention and will serve to make fully apparent all of the compounds embraced by the general formula given above.

Example 1

A solution of 2.0 g. of 2-phenyl-4,6-diamino-5-nitrosopyrimidine and 0.7 g. of malononitrile in 30 ml. of pyridine is heated at 90–95° C. for four hours. The resulting reaction mixture is then evaporated in a rotating flash evaporator to half volume and diluted with 100 ml. of water. The yellow crystalline solid which separates is collected by filtration, washed with water and recrystallized from aqueous dimethylformamide to give 2-phenyl-4,7-diamino-6-cyanopteridine, M.P.>360° C.

Example 2

To a stirred solution of 9.55 g. of p-chlorobenzamidine hydrochloride in 200 ml. of methanol is added, slowly, 11.1 g. of the silver salt of isonitrosomalononitrile. The resulting mixture is stirred for one hour and filtered. The filtrate is evaporated to dryness at 30–35° C. To the residue is added 150 ml. of a solution of 5-ethyl-2-methylpyridine and 2-picoline (2:1). The resulting solution is refluxed for 20 minutes. Addition of water and ethanol precipitates a dark green solid which is isolated by filtration and washed with ethanol to give 4,6-diamino-2-(p-chlorophenyl)-5-nitrosopyrimidine.

A mixture of 2.5 g. of the nitroso compound and 0.7 g. of malononitrile in 50 ml. of pyridine is heated at reflux for six hours. After evaporation and quenching, the desired 2-(p-chlorophenyl)-4,7-diamino-6-cyanopteridine is obtained.

Example 3

A solution of 4.65 g. of p-anisamidine hydrochloride in 50 ml. of methanol is treated with 5.55 g. of the silver salt of isonitrosomalononitrile and the resulting mixture is stirred for one hour. The mixture is filtered and the filtrate concentrated to dryness in vacuo at 30–40° C. The residual solid is boiled for five minutes in 30 ml. of 5-ethyl-2-methylpyridine. The solution is cooled, diluted with ethanol and filtered. The dark green solid obtained is 4,6-diamino-2-(p-methoxyphenyl)-5-nitrosopyrimidine, M.P. 278° C. (dec.).

Example 4

To a solution of 7.94 g. of p-toluamidine hydrochloride in 80 ml. of methanol is added 11.1 g. of the silver salt of isonitrosomalononitrile. The mixture is stirred for 45 minutes, filtered and concentrated to dryness in vacuo at 30–40° C. The residual yellow crystals are boiled with 50 ml. of 5-ethyl-2-methylpyridine for ten minutes. The mixture is cooled and treated with ethanol. The precipitate is filtered off and washed with ethanol and ether to give 4,6-diamino-5-nitroso-2-(p-methylphenyl)-pyrimidine, M.P. 279–280° C. (dec.).

A mixture of 1.2 g. of the pyrimidine and 0.4 g. of malononitrile in 30 ml. of pyridine is heated at 95° C. for three hours. The evaporated reaction mixture is diluted with water to separate 2-(p-methylphenyl)-4,7-diamino-6-cyanopteridine.

Example 5

A solution of 9.4 g. of o-chlorobenzamidine hydrochloride in 100 ml. of methanol is treated with 11.1 g. of the silver salt of isonitrosomalononitrile. The mixture is stirred for one hour and filtered. The filtrate is concentrated to dryness in vacuo at 30–40° C. The residue is refluxed with 75 ml. of 5-ethyl-2-methylpyridine for ten minutes. The mixture is cooled, diluted with ethanol and filtered. The solid material obtained is washed with ethanol and then with ether to give 4,6-diamino-2-(o-chlorophenyl)-5-nitrosopyrimidine.

A mixture of 1.25 g. of the pyrimidine and 0.4 g. of malononitrile in 30 ml. of pyridine is heated at 90–95° C. for four hours. The volatiles are taken off in vacuo and the residue triturated with water to give 2-(o-chlorphenyl)-4,7-diamino-6-cyanopteridine.

Example 6

To a solution of 8.5 g. of m-toluamidine hydrochloride in 80 ml. of methanol is added 11.1 g. of the silver salt of isonitrosomalononitrile. The mixture is stirred for one hour, filtered and the filtrate concentrated to dryness in vacuo. The residue is refluxed with a mixture of 100 ml. of 5-ethyl-2-methylpyridine and 50 ml. of 2-picoline and worked up as in Example 5 to give 4,6-diamino-5-nitroso-2-(m-methylphenyl)-pyrimidine.

A solution of 2.4 g. of the pyrimidine and 0.8 g. of malononitrile in 50 ml. of lutidine is heated at 85–90° C. for six hours. Evaporation under high vacuum and dilution with water gives 2-(m-methylphenyl)-4,7-diamino-6-cyanopteridine.

Example 7

To a stirred solution of 5.7 g. of o-butoxybenzamidine hydrochloride in 75 ml. of ethanol is added portionwise 5.55 g. of the silver salt of isonitrosomalononitrile. The resulting mixture is stirred for one hour and filtered. The filtrate is evaporated to dryness and the residue is refluxed for ten minutes in 50 ml. of 5-ethyl-2-methylpyridine, cooled and treated with 50 ml. of ethanol. Collection of the solid material by filtration gives 4,6-diamino-2-(o-butoxyphenyl)-5-nitrosopyrimidine.

A mixture of 2.9 g. of the nitrosopyrimidine and 0.7 g. of malonontrile in 75 ml. of pyridine is heated at 65–70° C. for eight hours. The reaction mixture is evaporated and quenched with water to separate 2-(o-butoxyphenyl)-4,7-diamino-6-cyanopteridine.

Example 8

To a solution of 7.0 g. of m-bromobenzamidine hydrobromide in 75 ml. of methanol is added 5.5 g. of the silver salt of isonitrosomalononitrile. The resulting solution is stirred for 30 minutes and filtered. The filtrate is evaporated to dryness in vacuo. The residue is boiled for fifteen minutes in 50 ml. of 5-ethyl-2-methylpyridine, cooled and 50 ml. of ethanol is added. The solid material, 4,6-diamino-2-(m-bromophenyl)-5 - nitrosopyrimidine, is isolated by filtration.

A solution of 2.8 g. of the pyrimidine and 0.7 g. of malononitrile in 40 ml. of pyridine is heated at 90° C. for five hours. Evaporation and quenching in water gives 2-(m-bromophenyl)-4,7-diamino-6-cyanopteridine.

Example 9

Dry hydrogen chloride is passed into an ethanol solution of p-ethylbenzonitrile (13.1 g.). The resulting solution is allowed to stand for 48 hours. The solid cake is broken up, crushed in a mortar and treated with 3.0 g. of dry ammonia in absolute ethanol. The reaction mixture is shaken for 20 hours, allowed to stand for 48 hours and filtered. The filtrate is allowed to evaporate to dryness and the residue is taken up in water. The aqueous solution is acidified with concentrated hydrochloric acid, decolorized with charcoal, filtered and the filtrate concentrated. Crystals of p-ethylbenzamidine hydrchloride are isolated by filtration.

The silver salt of isonitrosomalononitrile (11.1 g.) is added to a solution of 9.2 g. of p-ethylbenzamidine hydrochloride in 100 ml. of methyl alcohol. Working up the reaction mixture and refluxing with 5-ethyl-2-methylpyridine as in Example 8 gives 4,6-diamino-2-(p-ethylphenyl)-5-nitrosopyrimidine.

A mixture of 2.5 g. of the pyrimidine and 0.65 g. of malononitrile in 60 ml. of pyridine is heated at reflux for three hours. Evaporation and quenching gives the desired 2-(p-ethylphenyl)-4,7-diamino-6-cyanopteridine.

Example 10

A cooled ethanolic solution of 21.2 g. of m-bromo-p-methoxybenzonitrile is treated with dry hydrogen chloride. The resulting mixture is allowed to stand for 48 hours. The solid cake is crushed in a mortar and then treated with an ethanol solution containing 3.0 g. of dry ammonia. Working up as in Example 9 gives m-bromo-p-anisamidine hydrochloride.

To a stirred solution of 6.6 g. of m-bromo-p-anisamidine hydrochloride in 50 ml. of methanol is added 5.55 g. of the silver salt of isonitrosomalononitrile. The resulting mixture is stirred for one hour, filtered and concentrated to dryness in vacuo at 30–40° C. The residue is refluxed for ten minutes in 30 ml. of 5-ethyl-2-methylpyridine and 15 ml. of 2-picoline. Dilution with aqueous ethanol and filtration gives 4,6-diamino-2-(m-bromo-p-methoxyphenyl)-5-nitrosopyrimidine.

A solution of 3.1 g. of the pyrimidine and 0.7 g. of malononitrile in 50 ml. of pyridine is heated at 90–95° C. for eight hours. Evaporation and quenching in water gives 2-(m-bromo-p-methoxyphenyl) - 4,7 - diamino-6-cyanopteridine.

Example 11

A solution of 3.6 g. of sodium in 55 ml. of ethanol is added to a mixture of 10.0 g. of hydroxyl amine hydrochloride in 20 ml. of water and 17.2 g. of o-butyl-m-methoxybenzonitrile in 35 ml. of ethanol. The resulting mixture is refluxed for eight hours with stirring, then evaporated to dryness. Aqueous sodium hydroxide solution (10%) is added to the residue, the mixture is filtered and the filtrate acidified with glacial acetic acid. The precipitate, which is o-butyl-m-methoxybenzamidoxime, is isolated by filtration.

The o-butyl-m-methoxybenzamidoxime (11.0 g.) in ethanol solution in the presence of Raney nickel is hydrogenated at 65° C. until the theoretical amount of hydrogen is taken up. The mixture is filtered and evaporated to dryness in vacuo. The residue is dissolved in hot ethanol. The mixture is cooled, treated with dry hydrogen chloride and the o-butyl-m-methoxybenzamidine hydrochloride is isolated by filtration.

The silver salt of isonitrosomalononitrile (5.5 g.) is added to a stirred solution of 6.0 g. of o-butyl-m-methoxybenzamidine hydrochloride in 50 ml. of methanol. The resulting mixture is stirred for one hour, filtered and evaporated to dryness in vacuo. To the residue is added 50 ml. of 5-ethyl-2-methylpyridine and the resulting solution is refluxed for twenty minutes, then diluted with aqueous ethanol and filtered to give 4,6-diamino-2-(o-butyl-m-methoxyphenyl)-5-nitrosopyrimidine.

A mixture of 3 g. of the pyrimidine and 0.8 g. of malononitrile in 75 ml. of pyridine is heated for 10 hours. After evaporation and adding water, the desired 2 - (o - butyl - m - methoxyphenyl) - 4,7 - diamino - 6 - cyanopteridine separates.

Example 12

Dry hydrogen chloride is passed into a cooled solution of 54.5 g. of 3-thiophenecarbonitrile in 75 ml. of absolute ethanol and the resulting solution is allowed to stand for 48 hours. To the solid is added portionwise an 8% solution of dry ammonia in dry ethanol. The reaction mixture is shaken for 24 hours, allowed to stand for 48 hours and filtered. The filtrate is allowed to evaporate to dryness in the open air. The residue is dissolved in water. The aqueous solution is acidified with concentrated hydrochloric acid, treated with charcoal, filtered and concentrated. The crystals which form are isolated by filtration to give 3-thiophenecarboxamidine hydrochloride.

To a solution of 8.1 g. of 3-thiophenecarboxamidine hydrochloride in 80 ml. of methyl alcohol is added 11.1 g. of the silver salt of isonitrosomalononitrile. The resulting mixture is stirred for 30 minutes and filtered. The filtrate is evaporated to dryness in vacuo. The residue is refluxed with 50 ml. of 5-ethyl-2-methylpyridine for twenty minutes. The mixture is cooled, diluted with 100 ml. of ethanol and filtered to give 4,6-diamino-5-nitroso-2-(β-thienyl)-pyrimidine.

A solution of 2 g. of the pyrimidine and 0.7 g. of malononitrile in 50 ml. of pyridine is heated at 110° C. for several hours. After quenching in water, the 2-(β-thienyl)-4,7-diamino-6-cyanopteridine is obtained.

Example 13

Treatment of 54.5 g. of 2-thiophenecarbonitrile in ethanol solution with dry hydrogen chloride and subsequently with an ethanolic solution of ammonia and working up as in Example 12 yields 2-thiophenecarboxamidine hydrochloride.

The above-prepared hydrochloride (4.0 g.) is reacted with 5.6 g. of the silver salt of isonitrosomalononitrile in methanol solution and cyclized by subsequent refluxing with 35 ml. of 5-ethyl-2-methylpyridine as in Example 12 to give 4,6-diamino-5-nitroso-2-(α-thienyl)-pyrimidine. Reaction of this compound (1 g.) with 0.4 g. of malononitrile as in Example 12 gives 2-(α-thienyl)-4,7-diamino-6-cyanopteridine.

Example 14

To a mixture of 20 g. of 6-amino-2-phenyl-4-pyrimidol and 10 ml. of dimethylaniline is added 100 ml. of phosphorus oxychloride. The resulting mixture is refluxed for eight hours, then concentrated in vacuo. The residue is poured into water and treated with an excess of concentrated ammonium hydroxide. After heating the mixture on a steam bath for one hour, concentrating in vacuo and cooling, the precipitate is filtered off, washed with water and ground in a mortar with 15 ml. of 1 N sodium hydroxide. The solid material is filtered off and washed with water to give 6-amino-4-chloro-2-phenylpyrimidine.

Ten grams of 6-amino-4-chloro-2-phenylpyrimidine and 25 ml. of 25% aqueous methylamine are heated in a bomb at 125° C. for four hours. The product, 6-amino-4-methylamino-2-phenylpyrimidine, is isolated by filtration.

A mixture of 11.4 g. of 6-amino-4-methylamino-2-phenylpyrimidine and 200 ml. of 10% acetic acid is heated to 90° C. and filtered. The solution is cooled to 3° C. and treated with a solution of 5.0 g. of sodium nitrite in 15 ml. of water added portionwise. After one hour at 0° C. and one hour at room temperature, the mixture is filtered. The solid material obtained is washed with water and dried to give 6-amino-4-methylamino-5-nitroso-2-phenylpyrimidine. This compound (2.6 g.) is reacted with 0.8 g. of malononitrile in 100 ml. of pyridine and worked up as in Example 1 to give 2-phenyl-7-amino-4-methylamino-6-cyanopteridine.

Example 15

A mixture of 8.0 g. of 6-amino-4-chloro-2-phenylpyrimidine, prepared as in Example 14, and 30 ml. of 25% aqueous dimethylamine is heated in a bomb at 125° C. for four hours. 6-amino-4-dimethylamino-2-phenylpyrimidine is isolated from the mixture by filtration.

Ten grams of 6-amino-4-dimethylamino-2-phenylpyrimidine and 150 ml. of 10% acetic acid are heated at 90° C. and filtered. The mixture is cooled to 0° C. A solution of 4.0 g. of sodium nitrite in 10 ml. of water is added portionwise and the resulting mixture allowed to stand for one hour at 0° C. and one hour at room temperature. The precipitate is filtered off, washed with water and dried to give 6-amino-4-dimethylamino-5-nitroso-2-phenylpyrimidine.

The pyrimidine (2.3 g.) and 0.7 g. of malononitrile in 50 ml. of pyridine is heated at 90° C. for four hours to give 2-phenyl-7-amino-4-dimethylamino-6-cyanopteridine.

Example 16

Ten grams of 6-amino-4-chloro-2-phenylpyrimidine, made as in Example 14, and 7.5 g. of dibutylamine in aqueous solution are refluxed for five hours. Filtering the resulting mixture gives 6-amino-4-dibutylamino-2-phenylpyrimidine.

A mixture of 10.0 g. of the above prepared pyrimidine and 150 ml. of acetic acid are heated to 90° C., then filtered and cooled to 0° C. Four grams of sodium nitrite in aqueous solution are added portionwise. The mixture is allowed to stand for one hour at 0° C. and one hour at room temperature and the precipitated 6-amino-4-dibutylamino-5-nitroso-2-phenylpyrimidine is removed by filtration. This compound (2.6 g.) is reacted with 0.6 g. of malononitrile in 50 ml. of pyridine as in Example 1 to give 2-phenyl-7-amino-4-dibutylamino-6-cyanopteridine.

Example 17

The silver salt of isonitrosomalononitrile (5.55 g.), is added slowly in small portions to a stirred solution of 5.1 g. of o-amino-p-chlorobenzamidine hydrochloride in 75 ml. of methanol. The resulting mixture is stirred for one hour and filtered. Evaporating the filtrate to dryness, refluxing the residue with 50 ml. of 2-picoline, cooling, adding 50 ml. of ethanol and filtering gives 4,6-diamino-2-(o-amino-p-chlorophenyl)-5-nitrosopyrimidine.

A mixture of 1.3 g. of the pyrimidine and 0.6 g. of malononitrile in 50 ml. of pyridine is reacted as in Example 1 to give 2-(o-amino-p-chlorophenyl)-4,7-diamino-6-cyanopteridine.

Example 18

The silver salt of isonitrosomalononitrile (11.1 g.) is added to a solution of 10.8 g. of p-hydroxy-m-nitrobenzamidine hydrochloride in 100 ml. of methanol and the resulting mixture is stirred for 30 minutes and filtered. The filtrate is concentrated to dryness in vacuo at 30–35° C. The residue is refluxed with 100 ml. of 5-ethyl-2-methylpyridine for ten minutes. Working up as in Example 5 gives 4,6-diamino-2-(p-hydroxy-m-nitrophenyl)-5-nitrosopyrimidine, a portion of which (1.4 g.) is reacted with 0.4 g. of malononitrile to give the desired 2-(p-hydroxy-m-nitrophenyl)-4,7-diamino-6-cyanopteridine.

Example 19

To a solution of 8.5 g. of m-aminobenzamidine hydrochloride in 150 ml. of methanol is added slowly 11.1 g. of the silver salt of isonitrosomalononitrile. The resulting mixture is stirred for one hour and filtered. The filtrate is evaporated in vacuo at 30–35° C. The residue is refluxed with a solution of 5-ethyl-2-methylpyrimidine (100 ml.) and 2-picoline (50 ml.) for 20 minutes. The mixture is cooled and diluted with water and ethanol. The precipitate is isolated by filtration and washed with ethanol to give a dark green solid, 4,6-diamino-2-(m-aminophenyl)-5-nitrosopyrimidine.

This intermediate (2.2 g.) is reacted with 0.7 g. of malononitrile in 75 ml. of pyridine at 90–95° C. for seven hours. Evaporation and addition of water gives 2-(m-aminophenyl)-4,7-diamino-6-cyanopteridine.

Example 20

A suspension of 1 g. of 2-phenyl-4,7-diamino-2-cyanopteridine in 100 ml. of anhydrous ethanol with 1 g. of hydrazine is heated at reflux until a clear red solution results. The mixture is cooled and water added to separate a yellow solid, 2-phenyl-4,7-diamino-6-pteridineamidrazone; M.P. 287° C. (dec.), after recrystallization from aqueous dimethylformamide following initial extraction of the crude product with boiling ethanol.

A suspension of 1 g. of 2-phenyl-4,7-diamino-2-cyanopteridine in 100 ml. of anhydrous ethanol with 1 g. of N-methylhydrazine is heated at reflux. Cooling and the addition of water gives a yellow solid, 2-phenyl-4,7-diamino-6-pteridine-N-methyl-amidrazone, M.P. 310° C. (dec.). The crude product is purified by extraction with boiling ethanol and recrystallized from aqueous dimethylformamide.

A suspension of 1 g. of 2-phenyl-4,7-diamino-2-cyanopteridine in 150 ml. of anhydrous methanol with 0.75 g. of unsymmetrical dimethylhydrazine is heated at reflux for several hours. Cooling and the addition of water gives 2-phenyl-4,7-diamino - 6 - pteridine - N - dimethylamidrazone.

Amidrazone derivatives of any of the 6-cyano analogues of this invention are prepared similarly by heating the nitrile in alcohol with the desired hydrazine derivative.

*Example 21*

A suspension of 1 g. of 2-phenyl-4,7-diamino-6-cyanopteridine is reacted with an excess of hydrogen peroxide solution in a mixture of 10% sodium hydroxide solution and methanol at 40° C. The reaction mixture is neutralized, evaporated and cooled to separate 2-phenyl-4,7-diamino-6-pteridinecarboxamide.

What is claimed is:

1. A chemical compound having the following structural formula:

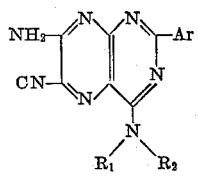

in which Ar is a member selected from the group consisting of thienyl and

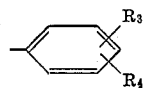

$R_3$ and $R_4$ are members selected from the group consisting of hydrogen, halogen of atomic weight less than 80, lower alkyl, lower alkoxy, nitro, amino and hydroxy; and $R_1$ and $R_2$ are members selected from the group consisting of hydrogen and lower alkyl.

2. A chemical compound having the following structural formula:

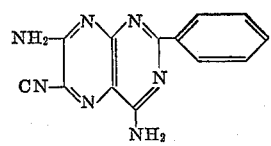

3. A chemical compound having the following structural formula:

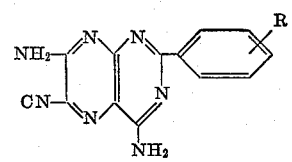

in which R is a halogen of atomic weight less than 80.

4. A chemical compound having the structural formula:

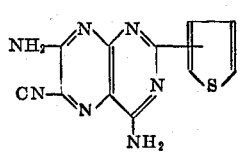

5. A chemical compound having the structural formula:

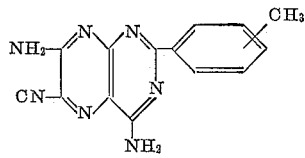

6. A chemical compound having the structural formula:

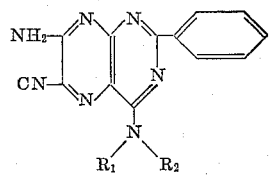

in which $R_1$ and $R_2$ are lower alkyl.

7. The method of preparing 2-aryl-4,7-diamino-6-cyanopteridines having the following structural formula:

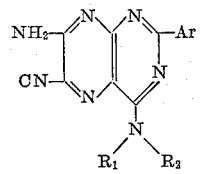

in which Ar is a member selected from the group consisting of thienyl and

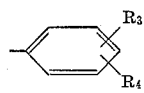

$R_3$ and $R_4$ are members selected from the group consisting of hydrogen, halogen of atomic weight less than 80, lower alkyl, lower alkoxy, nitro, amino and hydroxy; and $R_1$ and $R_2$ are members selected from the group consisting of hydrogen and lower alkyl; comprising reacting a 2-aryl-4,6-diamino-5-nitrosopyrimidine having the following formula:

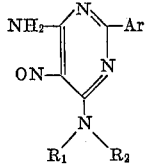

in which Ar, $R_1$ and $R_2$ are as defined hereabove with malononitrile at temperatures of from about 50° C. to about 150° C. in an organic solvent in which the reactants are substantially soluble and with which the reactants are nonreactive.

8. The method of claim 7 characterized in that the organic solvent is a liquid tertiary amine of boiling point above 50° C.

9. The method of claim 8 characterized in that the liquid tertiary amine is a member selected from the group consisting of pyridine and a lower alkyl-pyridine.

10. The method of claim 9 characterized in that the reaction temperature is about 85–100° C.

11. The method of claim 10 characterized in that the liquid tertiary amine is pyridine.

No references cited.